(12) United States Patent
Lyashevsky

(10) Patent No.: US 8,487,929 B2
(45) Date of Patent: Jul. 16, 2013

(54) RESOLUTION ENHANCEMENT OF VIDEO STREAM BASED ON SPATIAL AND TEMPORAL CORRELATION

(75) Inventor: Alexander Lyashevsky, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 603 days.

(21) Appl. No.: 12/772,591

(22) Filed: May 3, 2010

(65) Prior Publication Data

US 2011/0057933 A1 Mar. 10, 2011

Related U.S. Application Data

(60) Provisional application No. 61/240,823, filed on Sep. 9, 2009.

(51) Int. Cl.
*G06T 17/00* (2006.01)

(52) U.S. Cl.
USPC ........... 345/428; 345/421; 345/441; 345/582; 345/589; 382/167; 382/169; 382/254

(58) Field of Classification Search
USPC ................. 345/419, 428, 581, 582, 421, 441, 345/589; 382/167, 169, 254
See application file for complete search history.

(56) References Cited

U.S. PATENT DOCUMENTS

| | | | | |
|---|---|---|---|---|
| 4,521,803 | A * | 6/1985 | Gittinger | 348/430.1 |
| 6,208,997 | B1 * | 3/2001 | Sigeti et al. | 1/1 |
| 6,215,485 | B1 * | 4/2001 | Phillips | 345/698 |
| 6,222,944 | B1 * | 4/2001 | Li et al. | 382/250 |
| 6,370,196 | B1 * | 4/2002 | Griessl et al. | 375/240.16 |
| 7,379,612 | B2 * | 5/2008 | Milanfar et al. | 382/254 |
| 7,515,747 | B2 * | 4/2009 | Okutomi et al. | 382/167 |
| 7,956,930 | B2 * | 6/2011 | Sullivan | 348/581 |
| 2011/0142366 | A1 * | 6/2011 | Young | 382/274 |
| 2011/0150331 | A1 * | 6/2011 | Young | 382/167 |

\* cited by examiner

*Primary Examiner* — Kimbinh T Nguyen
(74) *Attorney, Agent, or Firm* — Sterne, Kessler, Goldstein & Fox P.L.L.C.

(57) ABSTRACT

A method and computer program product are provided for resolution enhancement of a video stream based on spatial and temporal correlation. For instance, the method can include predicting interpolated pixels for an image frame of the video stream based on a spatial correlation of pixels in the image frame. The method can also include generating one or more motion vectors for the image frame. Based on the spatially-correlated pixels and the one or more motion vectors, an enhanced image can be reconstructed. Further, the method can include providing a correction factor to one or more pixels in the enhanced image frame.

31 Claims, 11 Drawing Sheets

RESOLUTION ENHANCEMENT OF VIDEO STREAM BASED ON SPATIAL AND TEMPORAL CORRELATION

CROSS REFERENCE TO RELATED APPLICATION

This application claims the benefit of U.S. Provisional Application No. 61/240,823 (SKGF Ref. No. 1972.1160000), filed Sep. 9, 2009, titled "Resolution Enhancement of Video Stream Based on Spatial and Temporal Correlation," which is incorporated herein by reference in its entirety.

BACKGROUND

1. Field

Embodiments of the present invention generally relate to video image processing. More specifically, embodiments of the present invention refer to enhanced resolution in a video stream based on temporal and spatial correlation.

2. Background

Super-resolution refers to techniques to increase and enhance image or video resolution. Super-resolution techniques typically involve several low-resolution images (or a video sequence) that contain slightly different views of the same objects. In this case, the amount of the collective information on the objects is higher than information about the object in a single image frame. An ideal situation involves an object that moves between several low-resolution images, where additional information can be extracted about the object. However, if the object is stationary, then the information on the object is identical among the several low-resolution frames and no additional information can be extracted.

Super-resolution techniques typically apply spatial interpolation and motion compensation algorithms to extract pixel information from low-resolution images for use in generating an enhanced image frame (e.g. a high-resolution image frame). The extraction of spatial information within each low-resolution frame and temporal information due to object motion between low-resolution images is often computationally expensive for processing units (e.g., central processing unit, graphics processing unit, etc.), especially for larger low-resolution images.

As demand for real-time or near real-time video processing increases, improved super-resolution techniques are needed.

SUMMARY

Embodiments of the present invention include a method for resolution enhancement of a video stream based on spatial and temporal correlation. The method can include predicting interpolated pixels for an image frame of the video stream based on a spatial correlation of pixels in the image frame. The method can also include generating one or more motion vectors for the image frame. Based on the spatially-correlated pixels and the one or more motion vectors, an enhanced image can be reconstructed. Further, the method can include providing a correction factor to one or more pixels in the enhanced image frame.

Embodiment of the present invention also include a system for resolution enhancement of a video stream based on spatial and temporal correlation. The system can include a graphics processing unit (GPU) and a central processing unit (CPU). The GPU can be configured to perform a resolution enhancement function, where the resolution enhancement function includes the following: predicting interpolated pixels for an image frame of the video stream based on a spatial correlation of pixels in the image frame; generating one or more motion vectors for the image frame; reconstructing an enhanced image frame based on the spatially-correlated pixels and the one or more motion vectors; and, providing a correction factor to one or more pixels in the enhanced image frame. The CPU can be configured to instruct the GPU to perform the resolution enhancement function on the image frame of the video stream. Further, the system can include a video source configured to provide the CPU with a compressed video stream, a video decoder configured to decode the compressed video stream into an decompressed video stream, and a display configured to display the image frame with enhanced resolution. The CPU and GPU may be separate components or a single component and may include, for example, combinations of hardware, software, and firmware.

Embodiments of the present invention further include a computer program product for resolution enhancement of a video stream based on spatial and temporal correlation. The computer program product includes a computer-usable medium having computer program logic recorded thereon enabling a processor to analyze software code. The computer program logic can include the following: first computer readable program code to enable a processor to predict interpolated pixels for an image frame of the video stream based on a spatial correlation of pixels in the image frame; second computer readable program code to enable a processor to generate one or more motion vectors for the image frame; third computer readable program code to enable a processor to reconstruct an enhanced image frame based on the spatially-correlated pixels and the one or more motion vectors; and, fourth computer readable program code to enable a processor to provide a correction factor to one or more pixels in the enhanced image frame Further features and advantages of the present invention, as well as the structure and operation of various embodiments of the present invention, are described in detail below with reference to the accompanying drawings. It is noted that the invention is not limited to the specific embodiments described herein. Such embodiments are presented herein for illustrative purposes only. Additional embodiments will be apparent to a person of ordinary skill in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person of ordinary in the relevant art to make and use the invention.

DETAILED DESCRIPTION

The following detailed description refers to the accompanying drawings that illustrate exemplary embodiments consistent with this invention. Other embodiments are possible, and modifications can be made to the embodiments within the spirit and scope of the present invention. Therefore, the detailed description is not meant to limit the invention. Rather, the scope of the present invention is defined by the appended claims.

It would be apparent to one of ordinary skill in the relevant art that the present invention, as described below, can be implemented in many different embodiments of software, hardware, firmware, and/or the entities illustrated in the figures. Thus, the operational behavior of embodiments of the present invention will be described with the understanding that modifications and variations of the embodiments are possible, given the level of detail presented herein.

Figure 1:
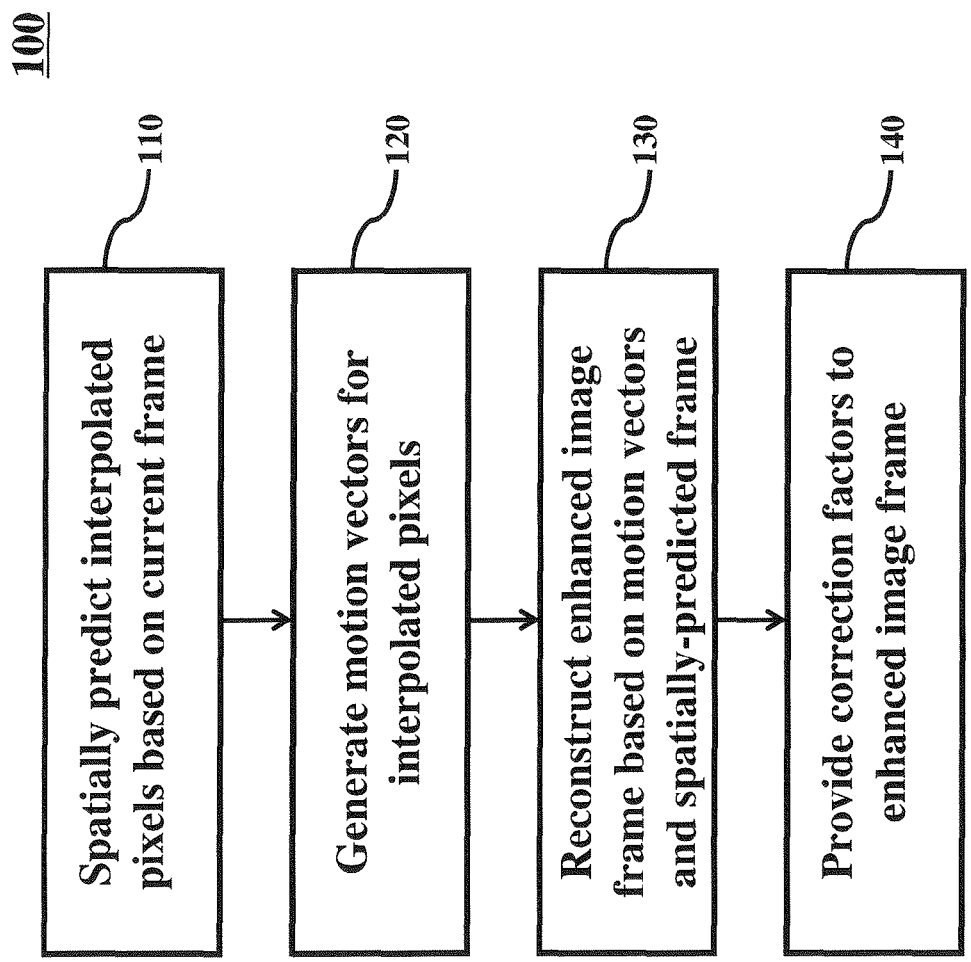
FIG. 1 is an illustration of a method for resolution enhancement of a video stream based on spatial and temporal correlation.

FIG. 1 is an illustration of a method 100 for resolution enhancement of a video stream based on spatial and temporal correlation. In an embodiment of the present invention, method 100 processes pixel information of an as-captured video image (e.g., via video camera) based on a luminance (Y) value of the pixel. To facilitate in the explanation of method 100, an exemplary sequence of low-resolution (LR) image frames will be used in the generation of a high-resolution image frame. Based on the description herein, a person of ordinary skill in the relevant art will recognize that other sequences of LR image frames can be used to implement embodiments of the present invention.

Figure 2:
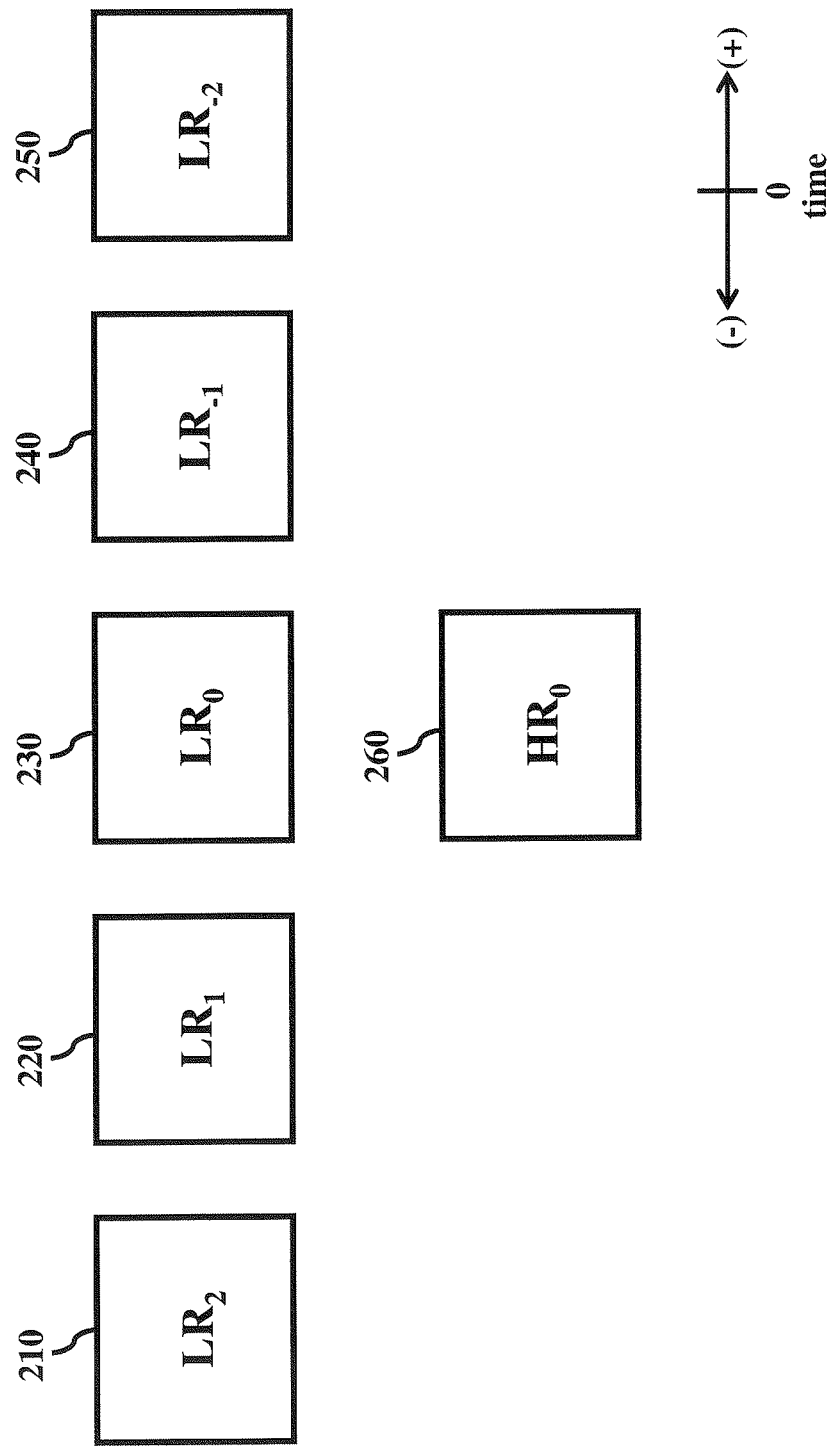
FIG. 2 is an illustration of an exemplary sequence of low-resolution frames and a high-resolution frame.

FIG. 2 is an illustration of an exemplary sequence of low-resolution frames $LR_2$, $LR_1$, $LR_0$, $LR_{-1}$, and $LR_{-2}$ and a high-resolution image frame $HR_0$. In this example, low-resolution image frames $LR_2$, $LR_1$, $LR_0$, $LR_{-1}$, and $LR_{-2}$ can represent a video sequence, where $LR_0$ represents a reference in time in comparison to $LR_2$, $LR_1$, $LR_{-1}$, and $LR_{-2}$. In other words, $LR_1$ and $LR_2$ represent image frames at a sequential, positive first time period and second time period, respectively, from $LR_0$. Similarly, $LR_{-1}$ and $LR_{-2}$ represent image frames at a sequential, negative first time period and second time period, respectively, from $LR_0$. $HR_0$ represents a current high-resolution image frame that is generated based on $LR_2$, $LR_1$, $LR_0$, $LR_{-1}$, and $LR_{-2}$ in accordance with method 100, which will be described further below, $LR_2$, $LR_1$, $LR_0$, $LR_{-1}$, $LR_{-2}$, and $HR_0$ will also be referred to herein by their respective element notations LR frame 210, LR frame 220, LR frame 230, LR frame 240, LR frame 250, and HR frame 260 in FIG. 2.

In step 110, interpolated pixels are generated for HR frame 260 based on a spatial correlation of content in LR frame 230. LR frame 230 is scaled up to generate HR frame 260, where scaling refers to an addition of pixels to LR frame 230 such that the resolution of LR frame 230 is enhanced, thus resulting in HR frame 260. In an embodiment, the addition of pixels to LR frame 230 is performed by adding interpolated pixels between existing pixels of LR frame 230 based on the content of LR frame 230.

Figure 3:
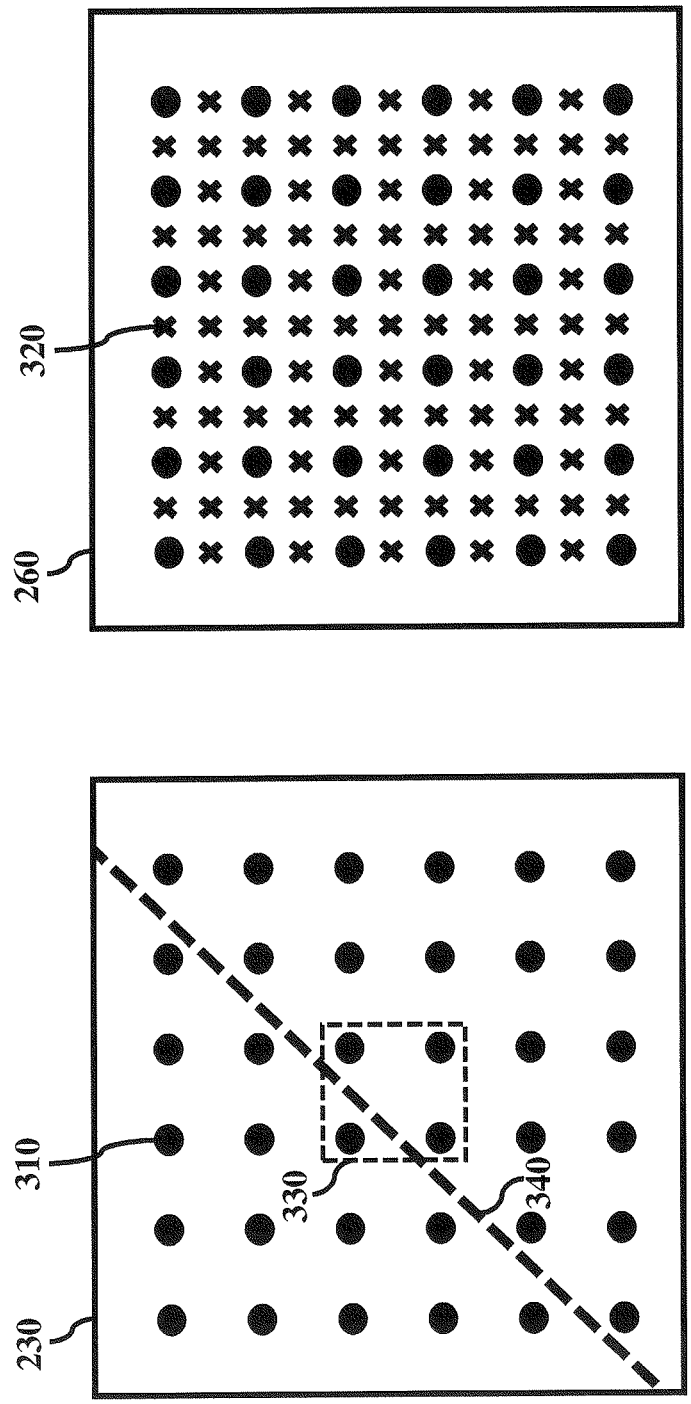
FIG. 3 is an illustration of an exemplary pixel image of a low-resolution frame and an exemplary pixel image of a high-resolution frame.

FIG. 3 is an illustration of an exemplary pixel image of LR frame 230 with pixels 310 and an image of a line edge 340 (e.g., content of LR 230) and an exemplary pixel image of HR frame 260 with interpolated pixels 320. Line edge 340 is an edge in LR frame 230, where an edge can refer to a sharp change in brightness in LR frame 230. Oftentimes, an image of an edge provides information on important events and changes in properties between a sequence of images (e.g., LR frames 210-250). Further, the detection of edges in an image can significantly reduce the amount of data processed and filters out information that may be regarded as less relevant, while preserving structural properties of the image. Edge detection techniques in images are known to a person of ordinary skill in the relevant art.

A goal of step 110, among others, is to accurately predict information in interpolated pixel 320 based on line edge 340 (e.g., content of LR frame 230). For ease of explanation, a portion 330 of LR frame 230 will be used to facilitate the explanation of step 110.

Figure 4:
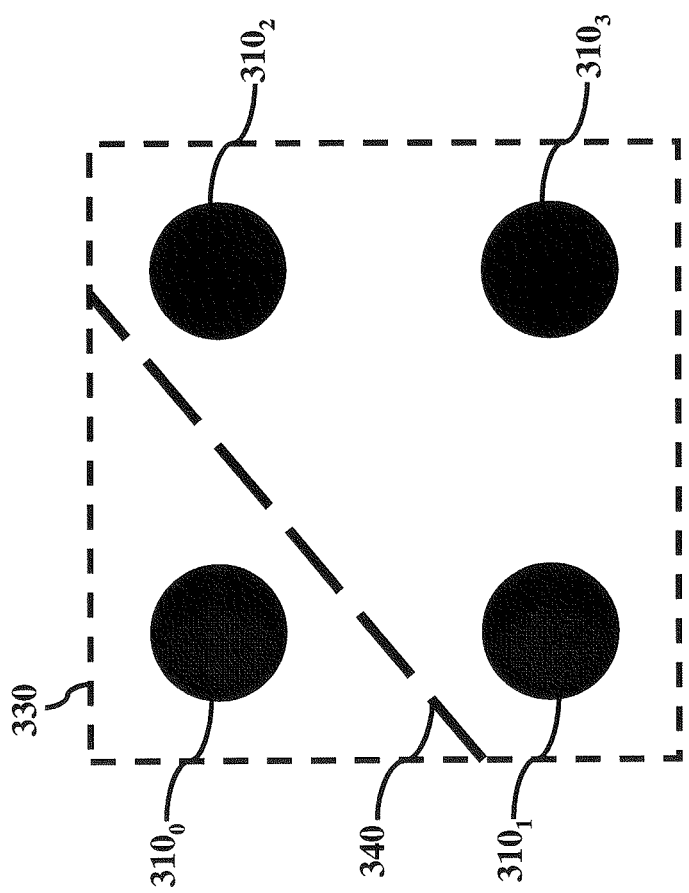
FIG. 4 is an illustration of a portion of an exemplary pixel image of a low-resolution frame.

FIG. 4 is an illustration of a larger view of portion 330 from the pixel image of LR frame 230. Here, based on edge detection techniques known to persons of ordinary skill in the art, it can be determined that line edge 340 traverses through portion 330.

In portion 330, a classification label can be assigned to a pixel in portion 330. In an embodiment, the classification label can be assigned to a top-left pixel $310_0$ of portion 330. The classification label provides sharpness information on portion 330, where if line edge 340 is greater than a predetermined sharpness intensity threshold value (e.g., luminance threshold value), then portion 330 can be designated accordingly. For instance, a "(+)" notation can be assigned to pixel $310_0$ to indicate that portion 330 contains a line edge that is greater than the predetermined sharpness intensity threshold value. In an embodiment, the predetermined sharpness intensity threshold value is based on a minimum luminance intensity that can be seen with the human eye. Based on the description herein, a person of ordinary skill in the relevant art will recognize that other pixels (e.g., $310_1$, $310_2$, and $310_3$ of FIG. 4) can be used as a reference for the classification label.

The above-described classification process is performed for each pixel of LR frame 230 using, for example, a similar 2×2 cell size as portion 330. Once complete, in an embodiment, the collective information indicative of each pixel's classification can be used to generate an overall mapping of LR frame 230. This mapping represents a particular minimum of sharpness intensity in line edge 340, according to an embodiment of the present invention. Pixels that have sharpness intensities greater than the predetermined threshold value are referred to herein as "sharp-edge pixels."

Figure 5:
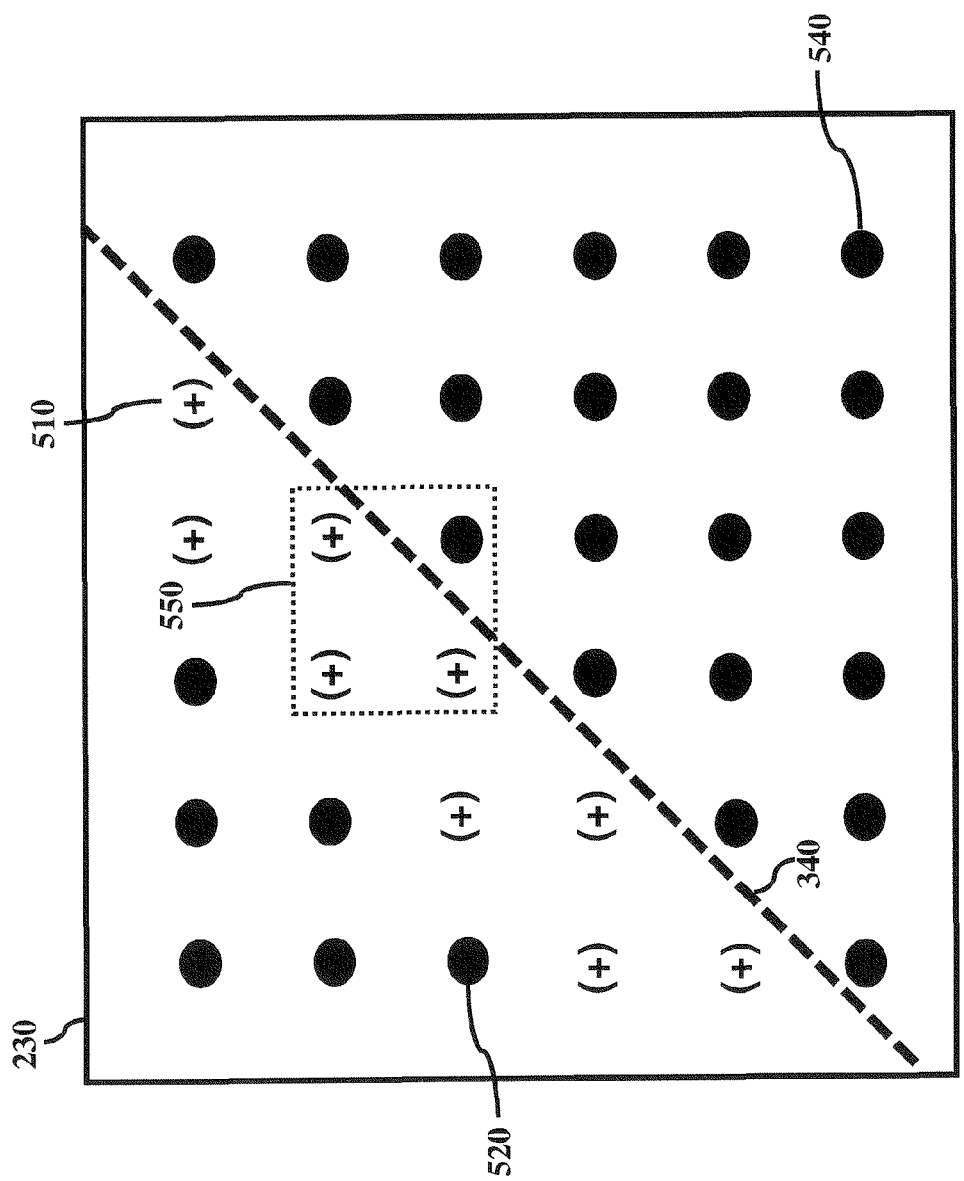
FIG. 5 is an illustration of an exemplary low-resolution frame with a mapping of sharp-edge pixels.

FIG. 5 is an illustration of an example LR frame 230 with a mapping of sharp-edge pixels 510 (indicated by "(+)" notation), which indicate that line edge 340 in each respective pixel's 2×2 cell is greater than the predetermined sharpness intensity threshold value described above.

Based on the location of the sharp edge pixels in LR frame 230, other pixels in LR frame 230 can be classified. In an embodiment, these other pixels in LR frame 230 can be classified by their radial distance from a sharp-edge pixel 510. In reference to FIG. 5, pixel 520 is adjacent to a sharp-edge pixel. Further, pixel 540 has a two-pixel radial distance from a sharp-edge pixel, where the two-pixel radius of pixel 540 does not come into contact with a sharp-edge pixel. Based on the description herein, a person of ordinary skill in the relevant art will recognize that LR frame 230 can have more than one line edge and that these line edges can vary in sharpness intensity (e.g., luminance).

Based on a pixel's radial distance from a sharp-edge pixel, a certain type of filter is applied to the pixel according to an embodiment of the present invention. In an embodiment, for pixels that have a radius of four or more pixels from a sharp-edge pixel, an eight-tap linear fixed weighting filter can be applied to these pixels. If the pixels have a three-pixel radius from a sharp-edge pixel, then a six-tap linear fixed weighting filter can be applied to these pixels according to an embodiment of the present invention. In an embodiment, if the pixels have a two-pixel radius from a sharp-edge pixel (e.g., pixel 540 of FIG. 5), then a four-tap linear fixed weighting filter can be applied to these pixels. As understood by a person of ordinary skill in the relevant art, linear fixed weighting filters generate accurate interpolated pixels when these filters are not applied on or near a line edge of an image frame.

In an embodiment, if the pixels are within a one-pixel radius from a sharp-edge pixel (e.g., pixel 520 of FIG. 5) or are classified as a sharp-edge pixel (e.g., pixel 510 of FIG. 5), then a linear fixed weighting filter is not applied to these pixels. Rather, a two-step process is used to determine the interpolated pixels (e.g., interpolated pixels 320 of FIG. 3) for these pixels according to an embodiment of the present invention. In an embodiment, the two-step process includes a warp function and a new-edge directed interpolation (NEDI) technique to analyze sharp-edge pixels and pixels in close proximity to sharp-edge pixels. Warp functions and NEDI techniques are known to a person of ordinary skill in the relevant art.

In an embodiment, the warp function is applied to a plurality of pixels surrounding line edge 340 such that interpolated pixels around the plurality of pixels are weighted based on the sharp-edge pixels. For instance, in reference to FIG. 5, a portion 550 of LR frame 230 illustrates three sharp-edge pixels (indicated by "(+)" notation) and one pixel surrounding line edge 340. In an embodiment, the warp function is applied to this 2×2 pixel cell so that a resulting set of interpolated pixels from this cell of pixels is more heavily-weighted based on the three sharp-edge pixels and less weighted on the non-sharp edge pixel. The warp function provides a digital output for the interpolated pixels, which is representative of line edge 340.

When a line edge is diagonal in an image frame (e.g., line edge 340 of FIG. 5), the digital output of the warp function may distort the resolution of the interpolated pixels due to quantization effects. NEDI techniques are another form of image processing algorithms that provide accurate resolution for diagonal line edges such as, for example, line edge 340.

In an embodiment, a NEDI algorithm is applied to a plurality of pixels surrounding line edge 340 (e.g., portion 550 of FIG. 5) such that interpolated pixels are weighted based on sharp-edge pixels. Based on the computational nature of NEDI algorithms, the results from NEDI algorithms may result in an unstable solution, as would be understood by a person of ordinary skill in the relevant art. In this situation, the results from the warp function are used in the generation of the interpolated pixels near line edge 340, according to an embodiment of the present invention.

In summary, step 110 generates interpolated pixels for HR frame 260 based on a spatial correlation among pixels in LR frame 230. The spatial correlation used in step 110 is based on a sharpness intensity (e.g., luminance) of a line edge in LR frame 230. In an embodiment, as described in further detail below with respect to step 130 of method 100, the spatially-predicted interpolated pixels from step 110 are used in a reconstruction of a high-resolution image frame.

In reference to method 100 of FIG. 1, in step 120, motion vectors are generated for interpolated pixels of a high-resolution frame. In an embodiment, a pyramid of image frames are generated based on a sequence of frames, where motion vectors can be determined for each level of the pyramid based on a higher level of the pyramid. More specifically, in an embodiment, a set of motion vectors from a higher level of the pyramid can be used as a predictor for the next, lower level of the pyramid. Further, in an embodiment, the determination of motion vectors for a current frame of image data is based on previous and future frames of image data that contains a similar or substantially same image or object as the current frame.

Figure 6:
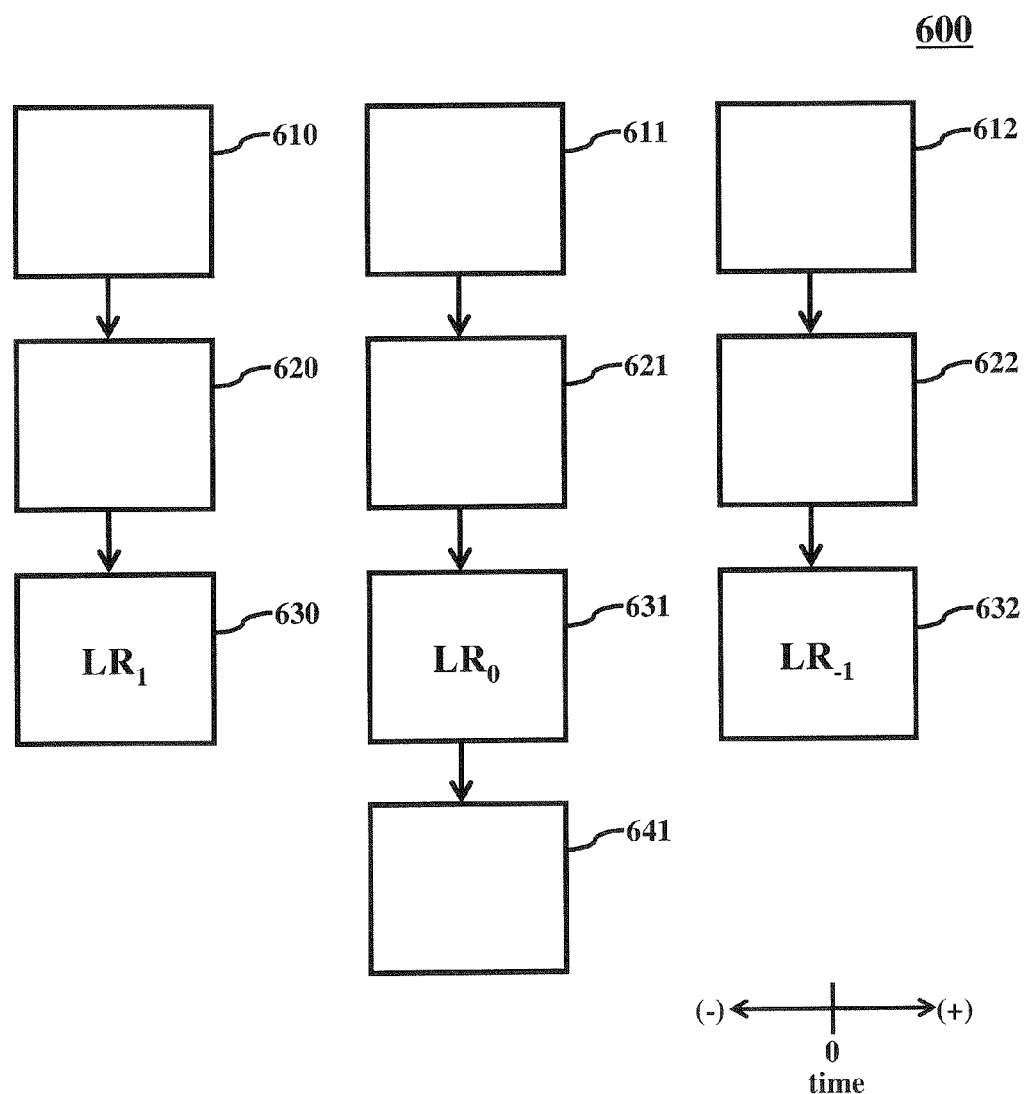
FIG. 6 is an illustration of an embodiment of a pyramid of image frames based on a sequence of low-resolution image frames.

FIG. 6 is an illustration of an embodiment of pyramid of image frames 600 based on a sequence of low-resolution (LR) image frames 630-632. Pyramid 600 includes LR frames 630, 631, and 632, which represent images frames captured at a sequential time period (e.g., by a video camera).

LR frame 631 represents an image frame captured at a reference in time (e.g., at t=0) and LR frames 630 and 632 represent image frames captured at a time period before (e.g., t=−1) and a time period after (t=+1) the reference in time. In an embodiment, frames 620-622 represent down-sampled versions of LR frames 630-632, respectively. Frames 620-622 can be down-sampled using, for example, a bi-cubic filter. Frames 610-612 represent down-sampled versions of frames 620-622, respectively, and can also be down-sampled using, for example, a bi-cubic filter. Frame 641 represents an upsampled version of LR frame 631, according to an embodiment of the present invention.

In an embodiment, the process of determining motion vectors for upsampled frame 641 begins with determining motion vectors for pixel cells in frame 611, in which the pixel cell is defined by a 2×2 arrangement of pixels. The determination of motion vectors for the 2×2 pixel cell in frame 611 can be used as a predictive step to determine motion vectors for pixel cells in frame 621, which in turn can be used to determine motion vectors for pixel cells in LR frame 631, according to an embodiment of the present invention. In an embodiment, the motion vectors for the pixel cells in LR frame 631 can ultimately be used to determine motion vectors for upsampled frame 641. This tiered, or pyramid, approach can be computationally efficient for computer systems as would be understood by a person of ordinary skill in the art based on the description herein.

Figure 7:
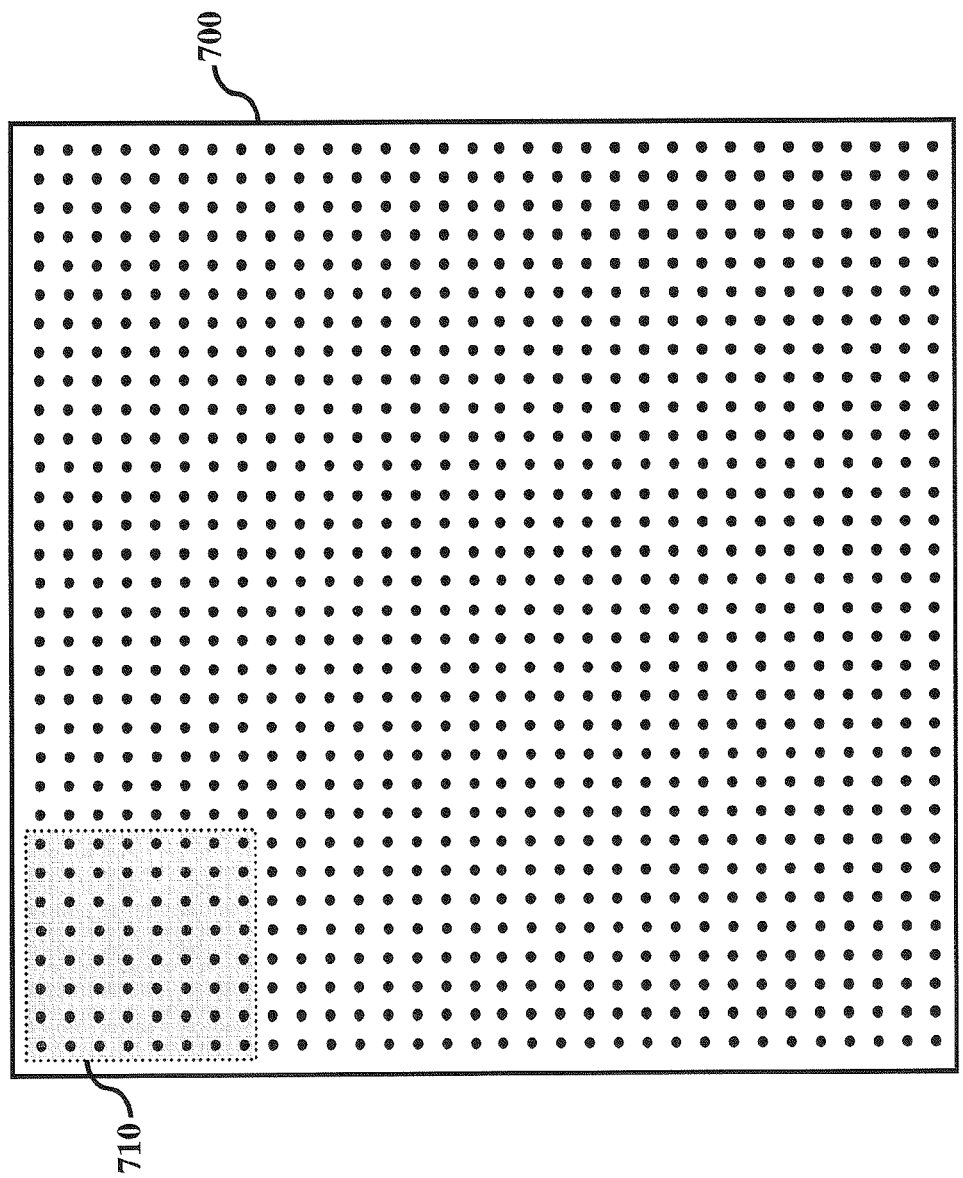
FIG. 7 is an illustration of an embodiment of a search window used to analyze a portion of a frame.

FIG. 7 is an illustration of an embodiment of a search window 700 that can be used to select a portion of previous frame 610, current frame 611, and future frame 612 to determine motion vectors for the 2×2 pixel cells in current frame 611. In an embodiment, search window 700 can be selected to be a 64×64 pixel cell, where the size of the search window can be based on, for example, computational bandwidth of the computer system or graphics processing unit used to execute method 100. For instance, as the size of the search window is used for lower-level image frames (e.g., frame 621), the area of the search in the lower-level image frame is greater, thus leading to a possible increase in computation time. Further, in an embodiment, search window can be based on a likelihood Within search window 700 for frames 610-612, a stabilization window 710 of 8×8 pixel cells can be used to search within each corresponding search window of frames 610-621 according to an embodiment of the present invention. The stabilization window serves as an averaging function for the 2×2 pixel cell to remove the effects of noise in an image, as would be understood by a person of ordinary skill in the relevant art. A person of ordinary skill in the relevant art will recognize that the sizes of search window 700 and stabilization window 710 are not limited to the embodiments described herein and that these windows can vary in size.

In an embodiment, when determining motion vectors for frame 611, stabilization window 710 for frame 611 and stabilization window 710 for frame 610 start the motion vector analysis at an upper left corner of each of the respective search windows 700 for frames 610 and 611. Comparing pixel cells in frame 611 to pixel cells in frame 610 may be used to determine motion vectors for pixel cells in frame 611 based on a minimum distance between corresponding images or objects in frames 610 and 611. In particular, pixels in stabilization window 710 for frame 610 are compared to pixels in the stabilization window 710 for frame 611 on a 2×2 pixel cell basis, according to an embodiment of the present invention. In an embodiment, a sum of absolute differences function can be used to compare luminance values of the pixel cells from frame 611 that correspond to luminance values of the pixel cells from frame 610. The results from the sum of absolute difference function can be normalized to determine an overall impact of the 8×8 pixel stabilization window, as would be understood by a person of ordinary skill in the relevant art.

Further, to assist in the determination of which portion of pixels in the 8×8 pixel cell stabilization window contribute to pixel changes (e.g., in luminance values) among frames 610 and 611, other stabilization window configurations can be applied to these frames according to an embodiment of the present invention. FIGS. 8A-8D are illustrations of embodiments of stabilization windows that can be used within stabilization window 710 to determine a relative contribution of pixels to image information in frames 610 and 611. These other stabilization window configurations are illustrated as shaded areas in FIGS. 8A-8D. A purpose of these other configurations of stabilization windows, among others, is to determine the presence of images or objects in these stabilization window configurations.

Figure 8A:
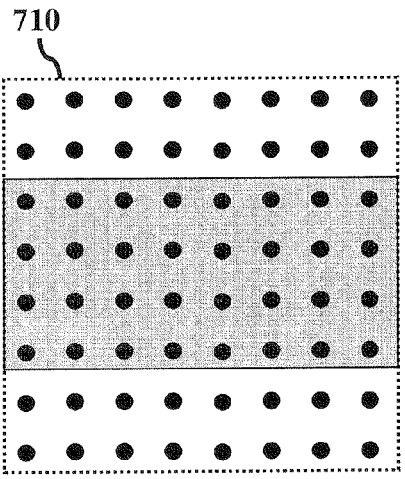
FIGS. 8A-8D are illustrations of embodiments of different stabilization window configurations.
Figure 8B:
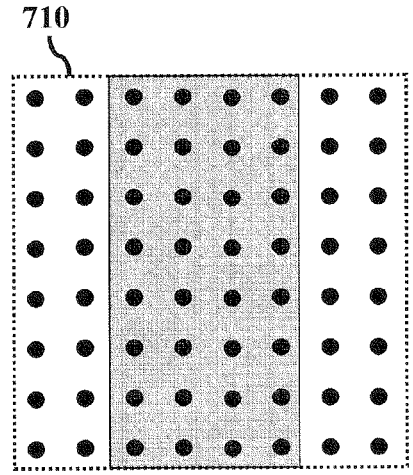
Figure 8C:
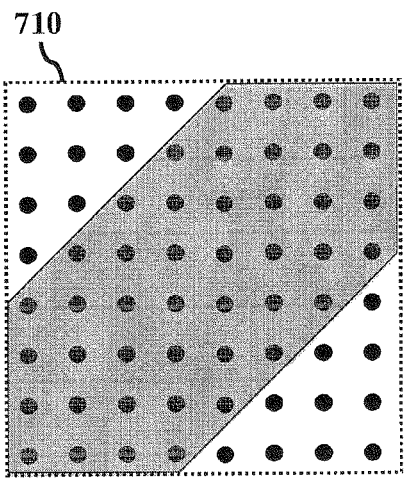
Figure 8D:
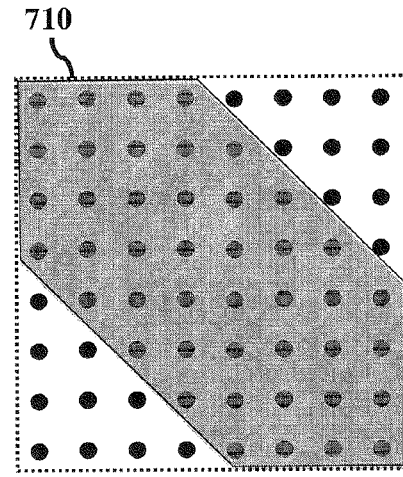

For instance, in FIG. 8A, a horizontal line can be detected in this stabilization window configuration, where a top and bottom portion of stabilization window 710 are not taken into account in the motion vector analysis (e.g., sum of absolute difference and normalization of results from the sum of absolute difference) between frames 610 and 611. In FIG. 8B, a vertical line can be detected in this stabilization window configuration, where left and right portions of stabilization window 710 are not taken into account in the motion vector analysis. In FIG. 8C, a diagonal line can be detected in this stabilization window configuration, where an upper left corner portion and a lower right corner portion of stabilization window 710 is not taken into account in the motion vector analysis. Further, in FIG. 8D, a diagonal line can be detected in this stabilization window configuration, where an upper right corner portion and a lower left corner portion of stabilization window 710 is not taken into account in the motion vector analysis. Based on the description herein, a person of ordinary skill in the relevant art will recognize that other stabilization window configurations can be applied in the motion vector analysis.

With the five configurations of stabilization windows described above with respect to FIGS. 7 and 8, luminance values of the pixels in stabilization window 710 from frame 610 can be compared to luminance values of the pixels in stabilization window 710 from frame 611 to determine the motion vectors for 2×2 pixel cells in frame 611, according to an embodiment of the present invention. In an embodiment, the stabilization window configuration that results in the lowest sum of absolute difference value (after normalization) is used for the motion vector analysis. Further, according to an embodiment of the present invention, if the results from the normalization of the sum of absolute difference function for the stabilization window with the lowest value is below a predetermined threshold value, then this is an indication that a particular 2×2 pixel cell in frame 610 can be used as a motion vector for the corresponding 2×2 pixel cell in frame 611. In other words, the luminance information from the 2×2 pixel cell in frame 610 is pertinent to the luminance information from the 2×2 pixel cell in frame 611. On the other hand, if the result from the normalization of the sum of absolute difference function is above the predetermined threshold value, then no motion vector information is determined to be pertinent to the 2×2 pixel cell in frame 611.

In an embodiment, a confidence map for frame 611 can be generated as an indication of the 2×2 pixel cells in frame 611 that have motion vector information. The confidence map and its associated motion vector information can be used as a predictor for a determination of motion vector information for the next, lower level of pyramid 600 of FIG. 6 (e.g., frame 621).

After the pixels in stabilization window 710 of frame 610 have been analyzed for motion vectors with the stabilization window configurations described above, stabilization window 710 of frame 610 is shifted one pixel to the right and the position of stabilization window 710 of frame 611 remains the same, according to an embodiment of the present invention. At this new stabilization window position of frame 610, the above-described motion vector analysis is performed between stabilization window 710 of frame 610 (which is now shifted by one pixel) and stabilization window 710 for frame 611. At the end of the motion vector analysis, stabilization window 710 of frame 610 is shifted another pixel to the right and another motion vector analysis is performed between the stabilization windows of frames 610 and 611. In an embodiment, at the end of a motion vector analysis, stabilization window 710 of frame 610 progresses through search window 700 of frame 610 in a raster-like movement (e.g., shifting to the right of its search window 700 one pixel at a time, shifting down a pixel once stabilization window 710 reaches a right edge of its search window 700, and then shifting to the left of its search window 700 one pixel at a time). In essence, the entire set of pixels in search window 700 of frame 610 is analyzed to determine motion vector information for frame 611 according to an embodiment of the present invention.

After stabilization window 710 of frame 610 analyzes pixels in search window 710 of frame 610, stabilization window 710 of frame 611 progresses through search window 700 of frame 611 in a raster-like pattern two pixels at a time, according to an embodiment of the present invention. For instance, stabilization window 710 of frame 611 shifts to the right of its search window 700 two pixels at a time, shifts two pixels down once stabilization window 710 reaches a right edge of its search window 700, and then shifts to the left of its search window 700 two pixels at a time.

In summary, with respect to the description of FIGS. 7 and 8, motion vectors are determined for 2×2 pixel cells in current frame 611 based on pixel information in previous frame 610. In an embodiment, a similar motion vector determination can also be applied in a determination of motion vectors for frame 611 based on future frame 612. The motion vectors extracted from previous frame 610 and future frame 612 provide additional pixel information for current frame 611, in which this additional pixel information can be applied to the next, lower level of pyramid 600 of FIG. 6 (e.g., frame 621).

In an embodiment, a chain of motion vectors can be generated for each level of pyramid 600 of FIG. 6. More specifically, in reference to FIG. 6, motion vectors for frame 610 can be determined based on frame 611 and a double down-sampled frame that corresponds to an image frame (not shown) that is captured two time periods after frame 631. In this example, the method described above with respect to determining motion vectors for frame 611 can be applied to frame 610. Similarly, this method can be applied to frame 612 based on frame 611 and a double down-sampled image frame captured two time periods before frame 631. As a result, in an embodiment, a chain of motion vectors can be determined for each level of images in pyramid 600 of FIG. 6, in which the different levels of motion vectors are updated as newly-captured image frames enter a temporal window of the video stream. In an embodiment, the temporal window can be defined as the number of image frames that are used in the determination of the motion vector chain.

As described above, with respect to FIGS. 7 and 8, a confidence map can be generated for frame 611, in which the confidence map represents 2×2 pixel cells in frame 611 that have motion vector information. This motion vector information can be used to facilitate a motion vector analysis for single down-sampled frame 621, according to an embodiment of the present invention. In an embodiment, the motion vector information can be used to provide a location of a search window to be analyzed in previous frame 620, current frame 621, and future frame 622.

In an example, a confidence map for frame 611 can contain x-y coordinates for a motion vector for a 2×2 pixel cell in frame 611 as being (200, 200). In using this motion vector information for the motion vector analysis of frame 621, the x-y coordinates can be upscaled to (400, 400) since frame 621 contains two times the number of pixels as frame 611. Further, in an embodiment of the present invention, a search window for frames 620-622 can be the same pixel size as the search window for frames 610-612 (e.g., 64×64 pixels). Also, in an embodiment, a stabilization window for the search windows of frames 620-622 can be the same pixel size as the stabilization windows for frames 610-612 (e.g., 8×8 pixels).

In determining motion vectors for a 2×2 pixel cell of frame 621, the search window (e.g., search window 700 of FIG. 7) can be placed at x-y coordinates (400, 400) for previous frame 620, current frame 621, and future frame 622, according to an embodiment of the present invention. Similar to the motion vector analysis described above, with respect to FIGS. 7 and 8, a stabilization window can be used to analyze pixels in the search windows for frames 620-622 so that motion vectors can be determined for frame 621. Also, in an embodiment, a confidence map can be generated for frame 621 to be used as a predictor for a determination of motion vector information for the next, lower level of pyramid 600 of FIG. 6 (e.g., frame 631).

In an embodiment, if there is no vector information for a 2×2 pixel cell of frame 621, then the search window for frames 620-622 is placed in a location that corresponds to a respective starting location in double down-sampled frames 610-612. Similar to the motion vector analysis described above, with respect to FIGS. 7 and 8, the stabilization window can be used to analyze pixels in the search window for frames 620-622 so that motion vectors can be determined for frame 621.

The motion vector analysis described above can be applied to each level of pyramid 600 of FIG. 6. As a result, a motion vector chain for each 2×2 pixel cell in frame 641 of FIG. 6 and a confidence map for the 2×2 pixel cells of frame 651 are generated. In an embodiment, this information is used in step 130 of FIG. 1 to determine interpolated pixels for upsampled frame 641 for a reconstructed high-resolution image frame.

In reference to method 100 of FIG. 1, in step 130, an enhanced image is reconstructed based on the spatially-predicted frame information from step 110 and the motion vector information from step 120. At this point, a high-resolution image frame has been generated from the spatial prediction method described above with respect to step 110. Also, motion vector chains for 2×2 pixel cells in an up-sampled version of a low-resolution image frame (e.g., frame 641 of FIG. 6) have been generated, along with a confidence map indicative of the 2×2 pixel cells in the up-sampled image frame that contain motion vector information, as described above with respect to step 120. A purpose of step 130, among others, is to reconstruct a high-resolution image frame based on the results of steps 110 and 120.

Figure 9:
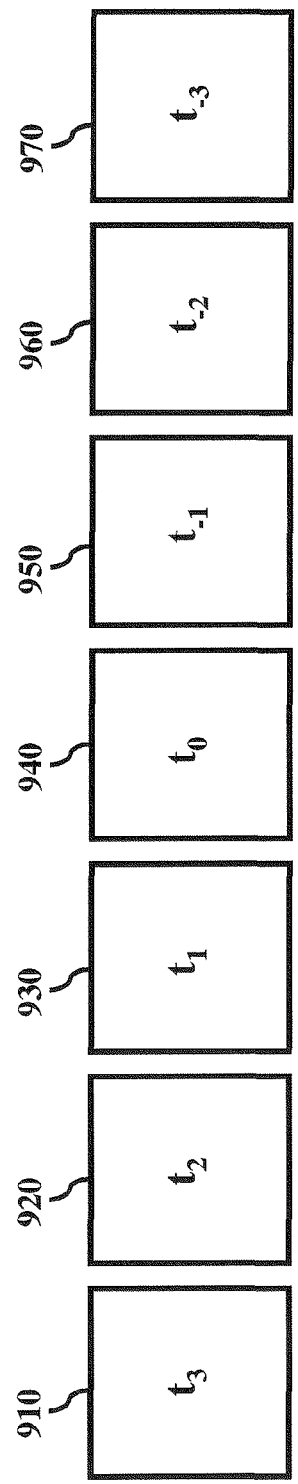
FIG. 9 is an illustration of an exemplary temporal window of upsampled versions of low-resolution images.

FIG. 9 is an illustration of an exemplary temporal window of upsampled versions of low-resolution images. Each of the upsampled image frames 910-970 is similar to frame 641 of FIG. 6, according to an embodiment of the present invention. In particular, in an embodiment, frames 910-970 represent a sequence of upsampled versions of a respective sequence of as-captured image frames. For example purposes and ease of explanation, step 130 will be explained in the context of frame 940, where a reconstructed high-resolution image frame for frame 940 is based on the spatially-predicted image frame data from step 110 and the motion vector data from step 120.

In an embodiment, for each 2×2 pixel cell in upsampled frame 940 that has a motion vector chain according to a confidence map of frame 940, the associated pixel information (e.g., luminance values) from the motion vector chain are sorted and filtered. For instance, in reference to FIG. 9, the motion vector chain for a 2×2 pixel cell of frame 940 can contain pixel information from frames 910-970. That is, as described above, frame 940 can have a motion vector chain based on previous frame 950 and future frame 930. Likewise, frame 930 can have a motion vector chain based on previous frame 940 and future frame 920. Frame 950 can also have a motion vector chain based on previous frame 960 and future frame 940. A person of ordinary skill in the relevant will recognize that the temporal window of a video stream can vary, in which motion vector chains can vary accordingly based on the number of image frames in the temporal window.

In a motion vector chain including pixel information from frames 910-970, the pixel information from these image frames can be sorted in ascending order according to an embodiment of the present invention. In an embodiment, a median filter is applied to the sorted pixel information to remove outlier pixels from the sorted data (e.g., removal of pixels corresponding to a minimum and maximum luminance value among the sorted pixel data). The resulting pixel information from the median filter is then applied as an interpolated pixel in upsampled frame 940.

In the instance where the confidence map of frame 940 does not indicate that a 2×2 pixel cell of frame 940 contains motion vector information, the spatially-predicted pixel information from step 110 is used an interpolated pixel in upsampled frame 940.

In summary, in step 130, the motion vector information from step 120 is used to determine the interpolated pixel information for upsampled frame 940. In the instance where no motion vector information is available, the spatially-predicted pixel information from step 110 is used to determine the interpolated pixel information for upsampled frame 940. Enhanced image frames can be generated for upsampled frames 910, 920, 930, 950, 960, and 970 based on step 130, according to an embodiment of the present invention.

In reference to method 100 of FIG. 1, in step 140, correction factors are provided for the enhanced image frame generated from step 130. In an embodiment, correction factors are provided for each interpolated pixel, in the enhanced image frame generated from step 130, that contains motion vector information.

Figure 10:
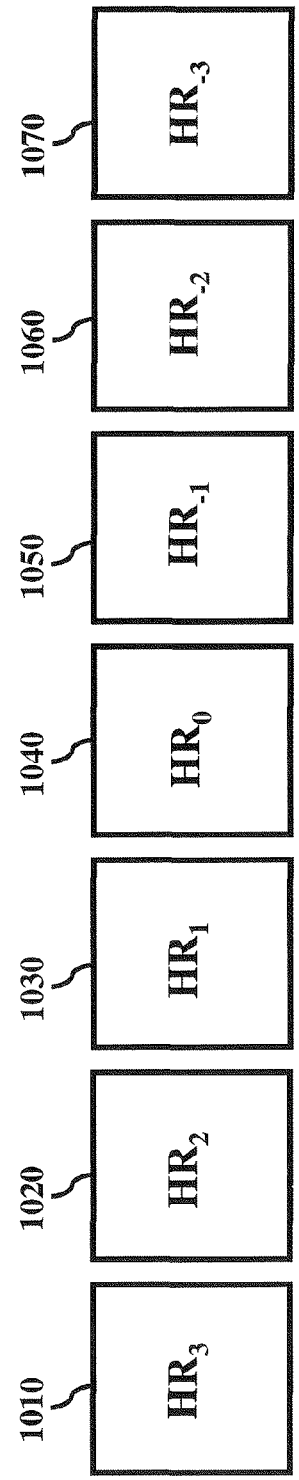
FIG. 10 is an illustration of an exemplary sequence of enhanced image frames.

FIG. 10 is an illustration of an exemplary sequence of enhanced image frames. Enhanced image frames 1010-1070 are high-resolution image frames with interpolated pixels generated as a result of step 130. In step 140, a correction factor can be associated with the interpolated pixels of enhanced frames 1010-1070 that contain motion vector information. For example purposes and ease of explanation, step 140 will be explained in the context of enhanced image frame 1040.

In an embodiment, each 2×2 pixel cell in frame 1040 having motion vector information (from step 120) is "pushed" to its neighboring frame. For instance, in reference to FIG. 10, a 2×2 pixel cell in frame 1040 having motion vector information is pushed back to image frame 1030 and image frame 1050 based on motion vector data for each of these neighboring frames. This "pushing back" process is referred to herein as inverse motion compensation. The 2×2 pixel cells in frame 1040 that do not have motion vector information are not taken into account in step 140, according to an embodiment of the present invention.

In an embodiment, after the inverse motion compensation process is complete for frame 1040, the resulting neighboring frames 1030 and 1050 are scaled back in order to match the scaling factor of as-captured frames (e.g., LR image frames 630 and 632 of FIG. 6). The scaled-back neighboring frames are compared to corresponding as-captured frames to generate an error frame, according to an embodiment of the present invention.

In reference to FIG. 10, the error frame process described above is applied to enhanced image frames 1010, 1020, 1030, 1050, 1060, and 1070, according to an embodiment of the present invention. In an embodiment, the error frames generated for enhanced image frames 1010-1070 are averaged to provide an overall averaged error frame. In an embodiment, this overall averaged error frame is applied to enhanced frame 1040 as a correction factor.

Figure 11:
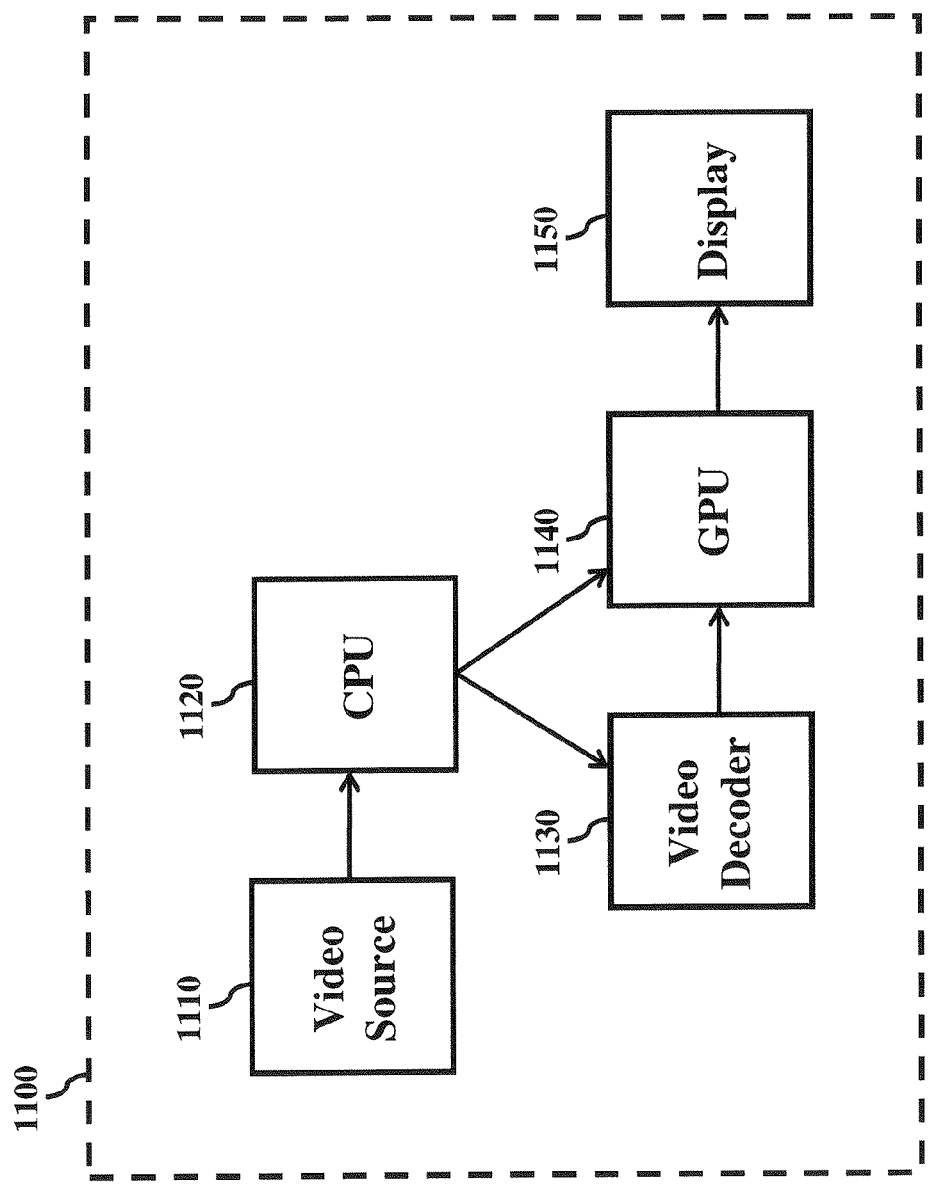
FIG. 11 is an illustration of an embodiment of a heterogeneous computing system 1100 in which embodiments of the present invention can be implemented

FIG. 11 is an illustration of an embodiment of a heterogeneous computing system 1100 in which embodiments of the present invention can be implemented. Heterogeneous computing system 1100 includes a video source 1110, a central processing unit (CPU) 1120, a video decoder 1130, a graphics processing unit (GPU) 1140, and a display 1150.

In an embodiment, video source 1110 provides a compressed video data stream to CPU 1120. Video source 1110 can be a media source such as, for example, a DVD encoded with MPEG video data and video streamed on the internet. Based on the description herein, a person of ordinary skill in the relevant art will recognize that other media sources can be used with embodiments of the present invention. These other media sources are within the scope and spirit of the present invention.

In an embodiment, CPU 1120 can include any commercially-available control processor or a custom-control processor. CPU 1120, for example, executes control logic that controls the operation of heterogeneous computing system 1100. In an embodiment, CPU 1120 provides control over the functionality of video decoder 1130. In particular, CPU 1120 provides video decoder 1130 with the compressed video data stream from video source 1110, as well as parameters for decompression of the video data stream. These decompression parameters can include, for example, bitrate, frame type, and resolution of the compressed video data stream. Based on these decompression parameters, video decoder 1130 can decode the compressed video data stream and provide the decompressed video data stream output to GPU 1140. Decompression methods and techniques are known to persons skilled in the relevant art.

CPU 1120 also provides control over the functionality of GPU 1140, according to an embodiment of the present invention. In an embodiment, GPU 1140 can include any commercially-available graphics processor or custom-designed graphics processor. GPU 1140 can execute specialized code for selected functions such as, for example, the resolution enhancement algorithm described above in method 100 of FIG. 1. In addition, GPU 1140 can be used to execute graphics functions such as, for example, graphics pipeline computations and rendering of images on display 1150.

With respect to providing control over the functionality of GPU 1140, CPU 1120 can instruct GPU 1140 to apply the resolution enhancement algorithm described above in method 100 of FIG. 1 to decompressed video data frames provided by video decoder 1130. In particular, GPU 1140 can perform the spatial correlation algorithm of step 110 and the temporal correlation algorithm of step 120 on pixel cells in the decompressed video data frame. Further, GPU 1140 can re-construct a high-resolution video data frame based on step 130, as well as provide error correction for the high-resolution video data frame based on step 140. The resulting high-resolution video data frame from method 100 of FIG. 1, as executed by GPU 1140, is displayed on display 150.

In summary, in heterogeneous computing system 1100, CPU 1120 provides control of the functionality of video decoder 1130 and GPU 1140, while GPU 1140 is tasked with execution of the resolution enhancement algorithm described above in method 100 of FIG. 1, according to an embodiment of the present invention. Among others, an advantage of tasking GPU 1140 with the resolution enhancement algorithm of method 100 (rather than CPU 1120) is that CPU 1120 is not computationally loaded with execution of the resolution enhancement algorithm and, thus, has extra computing bandwidth to perform other computing functions for heterogeneous computing system 1100.

Figure 12:
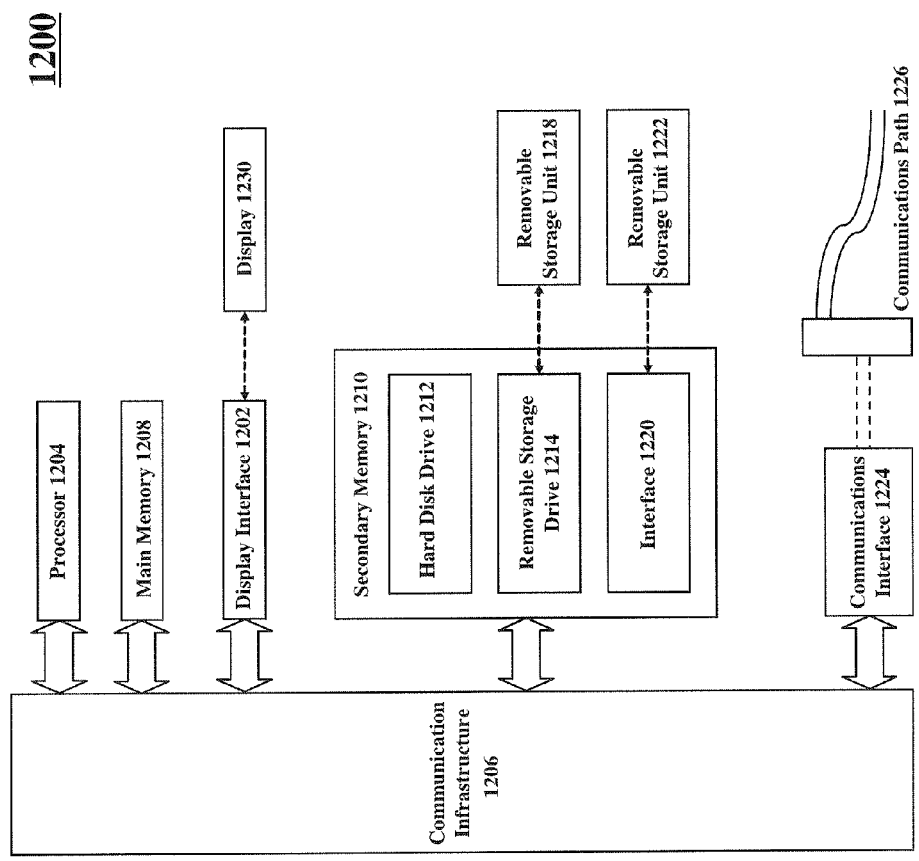
FIG. 12 is an illustration of an example computer system in which embodiments of the present invention can be implemented.

Various aspects of the present invention may be implemented in software, firmware, hardware, or a combination thereof. FIG. 12 is an illustration of an example computer system 1200 in which embodiments of the present invention, or portions thereof, can be implemented as computer-readable code. For example, the method illustrated by flowchart 100 of FIG. 1 can be implemented in computer system 1200. Various embodiments of the present invention are described in terms of this example computer system 1200. After reading this description, it will become apparent to a person of ordinary skill in the relevant art how to implement embodiments of the present invention using other computer systems and/or computer architectures.

It should be noted that the simulation, synthesis and/or manufacture of various embodiments of this invention may be accomplished, in part, through the use of computer readable code, including general programming languages (such as C or C++), hardware description languages (HDL) such as, for example, Verilog HDL, VHDL, Altera HDL (AHDL), or other available programming and/or schematic capture tools (such as circuit capture tools). This computer readable code can be disposed in any known computer-usable medium including a semiconductor, magnetic disk, optical disk (such as CD-ROM, DVD-ROM). As such, the code can be transmitted over communication networks including the Internet. It is understood that the functions accomplished and/or structure provided by the systems and techniques described above can be represented in a core (such as a GPU core) that is embodied in program code and can be transformed to hardware as part of the production of integrated circuits.

Computer system 1200 includes one or more processors, such as processor 1204. Processor 1204 may be a special purpose or a general purpose processor (e.g., a GPU). Processor 1204 is connected to a communication infrastructure 1204 (e.g., a bus or network).

Computer system 1200 also includes a main memory 1208, preferably random access memory (RAM), and may also include a secondary memory 1210. Secondary memory 1210 can include, for example, a hard disk drive 1212, a removable storage drive 1214, and/or a memory stick. Removable storage drive 1214 can include a floppy disk drive, a magnetic tape drive, an optical disk drive, a flash memory, or the like. The removable storage drive 1214 reads from and/or writes to a removable storage unit 1218 in a well known manner. Removable storage unit 1218 can comprise a floppy disk, magnetic tape, optical disk, etc. which is read by and written to by removable storage drive 1214. As will be appreciated by persons skilled in the relevant art, removable storage unit 1218 includes a computer-usable storage medium having stored therein computer software and/or data.

In alternative implementations, secondary memory 1210 can include other similar devices for allowing computer programs or other instructions to be loaded into computer system 1200. Such devices can include, for example, a removable storage unit 1222 and an interface 1220. Examples of such devices can include a program cartridge and cartridge interface (such as those found in video game devices), a removable memory chip (e.g., EPROM or PROM) and associated socket, and other removable storage units 1222 and interfaces 1220 which allow software and data to be transferred from the removable storage unit 1222 to computer system 1200.

Computer system 1200 can also include a communications interface 1224. Communications interface 1224 allows software and data to be transferred between computer system 1200 and external devices. Communications interface 1224 can include a modem, a network interface (such as an Ethernet card), a communications port, a PCMCIA slot and card, or the like. Software and data transferred via communications interface 1224 are in the form of signals, which may be electronic, electromagnetic, optical, or other signals capable of being received by communications interface 1224. These signals are provided to communications interface 1224 via a communications path 1226. Communications path 1226 carries signals and can be implemented using wire or cable, fiber optics, a phone line, a cellular phone link, a RF link or other communications channels.

In this document, the terms "computer program medium" and "computer-usable medium" are used to generally refer to media such as removable storage unit 1218, removable storage unit 1222, and a hard disk installed in hard disk drive 1212. Computer program medium and computer-usable medium can also refer to memories, such as main memory 1208 and secondary memory 1210, which can be memory semiconductors (e.g., DRAMs, etc.). These computer program products provide software to computer system 1200.

Computer programs (also called computer control logic) are stored in main memory 1208 and/or secondary memory 1210. Computer programs may also be received via communications interface 1224. Such computer programs, when executed, enable computer system 1200 to implement embodiments of the present invention as discussed herein. In particular, the computer programs, when executed, enable processor 1204 to implement processes of embodiments of the present invention, such as the steps in the methods illustrated by flowchart 100 of FIG. 1, discussed above. Accordingly, such computer programs represent controllers of the computer system 1200. Where embodiments of the present invention are implemented using software, the software can be stored in a computer program product and loaded into computer system 1200 using removable storage drive 1214, interface 1220, hard drive 1212, or communications interface 1224.

Embodiments of the present invention are also directed to computer program products including software stored on any computer-usable medium. Such software, when executed in one or more data processing device, causes a data processing device(s) to operate as described herein. Embodiments of the present invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by persons skilled in the relevant art that various changes in form and details can be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for resolution enhancement of a video stream based upon spatial and temporal correlation, comprising:
   predicting, using a processing device, interpolated pixels for an image frame of the video stream based on a spatial correlation of pixels in the image frame, wherein the predicting comprises classifying one or more pixels in the image frame as a sharp-edge pixel and filtering the one or more pixels of the image frame based on a radial pixel distance of the pixels from a sharp edge pixel;
   generating, using the processing device, one or more motion vectors for the Image frame;
   reconstructing, using the processing device, an enhanced image frame based on the spatially-correlated pixels and the one or more motion vectors; and
   providing, using the processing device, a correction factor to one or more pixels in the enhanced image frame.

2. The method of claim 1, wherein the classifying the one or more pixels comprises comparing the one or more pixels to a predetermined threshold value.

3. The method of claim 1, wherein the filtering the pixels comprises, if a pixel of the image frame has a radius of two or more pixels from the sharp-edge pixel, applying a linear fixed weighting filter to the pixel.

4. The method of claim 1, wherein the filtering the pixels comprises, when a pixel of the image frame has a radius of one or less from the sharp-edge pixel, applying at least one of a warp function and a near-edge detection interpolation (NEDI) technique to the pixel.

5. The method of claim 4, wherein the applying at least one of the warp function and the NEDI technique comprises applying the warp function to the pixel if a result of the NEDI technique is unstable.

6. The method of claim 1, wherein the generating the one or more motion vectors for the image frame comprises generating a pyramid of sequence of image frames from the video stream, a first end of the pyramid comprising a double down-sampled version of the sequence of image frames and a second end of the pyramid comprising an up-sampled version of the sequence of image frames.

7. The method of claim 6, wherein the generating the pyramid of sequence of image frames comprises:
 generating a first set of motion vectors for the double down-sampled version of the sequence of image frames; and
 generating a second set of motion vectors for a single down-sampled version of the sequence of image frames based on the first set of motion vectors.

8. The method of claim 6, wherein the generating the one or more motion vectors for the image frame comprises generating a double upsampled motion vector chain based on the second set of motion vectors.

9. The method of claim 1, wherein the generating the one or more motion vectors for the image frame comprises generating a confidence map for one or more pixel cells of the image frame, the confidence map indicative of pixel cells having motion vector information.

10. The method of claim 1, wherein the generating the one or more motion vectors for the image frame comprises generating a search window and a stabilization window for a previous, current, and future image frame of the video stream, the stabilization window used to determine motion vector information for pixel cells in the search window.

11. The method of claim 1, wherein the reconstructing the enhanced image frame comprises sorting pixel information from a plurality of pixel cells in a motion vector chain.

12. The method of claim 11, wherein the sorting the pixel information comprises:
 sorting the pixel information in ascending order to generate a sorted list; and
 removing a minimum value and a maximum value from the sorted list.

13. The method of claim 12, wherein the removing the minimum and maximum values comprise applying a median filter to the pixel information in the sorted list.

14. The method of claim 1, wherein the reconstructing the enhanced image frame comprises applying a spatially-correlated pixel as an interpolated pixel in the enhanced image frame when the interpolated pixel does not have motion vector information.

15. The method of claim 1, wherein the providing the correction factor comprises:
 applying an inverse motion compensation technique to a first pixel cell in to enhanced image frame to generate a second pixel cell in an adjacent enhanced image frame based on motion vector information of the first pixel cell;
 scaling the second pixel cell with a scale factor to generate a scaled-pixel cell at a substantially similar scale as an as-captured image frame; and
 comparing the scaled-pixel cell to a corresponding pixel cell in the as-captured image frame to generate an error factor for the scaled-pixel cell.

16. The method of claim 15, wherein the providing the correction factor comprises repeating the applying, scaling, and comparing to a remaining portion of pixel cells, in the enhanced image frame, that contain motion vector information.

17. The method of claim 1, wherein the providing the correction factor comprises:
 averaging a plurality of error frames from each enhanced image frame in a temporal window to generate an average error frame; and
 applying the average error frame to one or more pixels in the enhanced reference frame.

18. A system for resolution enhancement of a video stream based upon spatial and temporal correlation, comprising:
 a graphics processing unit (GPU) configured to perform a resolution enhancement function, wherein the resolution enhancement function comprises:
  predicting interpolated pixels for an image frame of the video stream based on a spatial correlation of pixels in the image frame, wherein the predicting comprises classifying one or more pixels in the image frame as a sharp-edge pixel and filtering the one or more pixels of the image frame based on a radial pixel distance of the pixels from a sharp-edge pixel;
  generating one or more motion vectors for the image frame;
  reconstructing an enhanced image frame based on the spatially-correlated pixels and the one or more motion vectors; and
  providing a correction factor to one or more pixels in the enhanced image frame; and
 a central processing unit (CPU) configured to instruct the GPU to perform the resolution enhancement function on the image frame of the video stream.

19. The system of claim 18, further comprising:
 a video source configured to provide the CPU with a compressed video stream;
 a video decoder configured to decode the compressed video stream into an decompressed video stream; and
 a display configured to display the image frame with enhanced resolution.

20. The system of claim 19, wherein the CPU is configured to provide decompression parameters to the video decoder.

21. The system of claim 19, wherein the GPU is configured to render the image frame with enhanced resolution on the display.

22. A computer program product comprising a non-transitory computer-readable medium having computer program logic recorded thereon enabling a processor to analyze software code, the computer program logic comprising:
 first computer readable program code to enable a processor to predict interpolated pixels for an image frame of the video stream based on a spatial correlation of pixels in the image frame, wherein the predicting comprises classifying one or more pixels in the image frame as a sharp-edge pixel and filtering the one or more pixels of the image frame based on a radial pixel distance of the pixels from a sharp-edge pixel;
 second computer readable program code to enable a processor to generate one or more motion vectors for the image frame;
 third computer readable program code to enable a processor to reconstruct an enhanced image frame based on the spatially-correlated pixels and the one or more motion vectors; and
 fourth computer readable program code to enable a processor to provide a correction factor to one or more pixels in the enhanced image frame.

23. The computer program product of claim 22, wherein the fifth computer readable program code comprises:
sixth computer readable program code to enable a processor to, when a pixel of the image frame has a radius of two or more pixels from the sharp-edge pixel, applying a linear fixed weighting filter to the pixel.

24. The computer program product of claim 22, wherein the fifth computer readable program code comprises:
sixth computer readable program code to enable a processor to, when a pixel of the image frame has a radius of one or less from the sharp-edge pixel, apply at least one of a warp function and a near-edge detection interpolation (NEDI) technique to the pixel.

25. The computer program product of claim 22, wherein the second computer readable program code comprises:
fifth computer readable program code to enable a processor to generate a pyramid of sequence of image frames from the video stream, a first end of the pyramid comprising a double down-sampled version of the sequence of image frames and a second end of the pyramid comprising a double up-sampled version of the sequence of image frames.

26. The computer program product of claim 22, wherein the second computer readable program code comprises:
fifth computer readable program code to enable a processor to generate a confidence map for one or more pixel cells of the image frame, the confidence map indicative of pixel cells having motion vector information.

27. The computer program product of claim 22, wherein the third computer readable program code comprises:
fifth computer readable program code to enable a processor to sort pixel information from a plurality of pixel cells in a motion vector chain.

28. The computer program product of claim 22, wherein the third computer readable program code comprises:
fifth computer readable program code to enable a processor to apply a spatially-correlated pixel as an interpolated pixel in the enhanced image frame when the interpolated pixel does not have motion vector information.

29. The computer program product of claim 22, wherein the fourth computer readable program code comprises:
fifth computer readable program code to enable a processor to apply an inverse motion compensation technique to a first pixel cell in to enhanced image frame to generate a second pixel cell in an adjacent enhanced image frame based on motion vector information of the first pixel cell;
sixth computer readable program code to enable a processor to scale the second pixel cell with a scale factor to generate a scaled-pixel cell at a substantially similar scale as an as-captured image frame; and
seventh computer readable program code to enable a processor to compare the scaled-pixel cell to a corresponding pixel cell in the as-captured image frame to generate an error factor for the scaled-pixel cell.

30. The computer program product of claim 29, wherein the fourth computer readable program code comprises:
eighth computer readable program code to enable a processor to repeat a sequence of the fifth, sixth, and seventh computer readable program codes to a remaining portion of pixel cells, in the enhanced image frame, that contain motion vector information.

31. The computer program product of claim 22, wherein the fourth computer readable program code comprises:
fifth computer readable program code to enable a processor to average a plurality of error frames from each enhanced image frame in a temporal window to generate an average error frame; and
sixth computer readable program code to enable a processor to apply the average error frame to one or more pixels in the enhanced reference frame.

* * * * *

UNITED STATES PATENT AND TRADEMARK OFFICE
CERTIFICATE OF CORRECTION

| | | |
|---|---|---|
| PATENT NO. | : 8,487,929 B2 | |
| APPLICATION NO. | : 12/772591 | |
| DATED | : July 16, 2013 | |
| INVENTOR(S) | : Alexander Lyashevsky | |

It is certified that error appears in the above-identified patent and that said Letters Patent is hereby corrected as shown below:

In the Claims

Column 14

Line 48, please replace "sharp edge" with --sharp-edge--.

Column 14

Line 50, please replace "Image" with --image--.

Signed and Sealed this
Twenty-fourth Day of June, 2014

Michelle K. Lee
*Deputy Director of the United States Patent and Trademark Office*